United States Patent
Palenius et al.

(10) Patent No.: US 6,373,878 B1
(45) Date of Patent: Apr. 16, 2002

(54) USING A FAST AGC AS PART OF SIR CALCULATION

(75) Inventors: Torgny Palenius, Lund; Martin Jonson, Malmö, both of (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/184,509

(22) Filed: Nov. 2, 1998

(51) Int. Cl.[7] ............................ G08C 19/16; H04B 15/00
(52) U.S. Cl. ......................... 375/136; 375/345; 370/335
(58) Field of Search ................................. 375/345, 340, 375/142, 144, 148, 150, 346, 262, 265, 130, 136; 370/320, 335, 342, 441, 252; 455/250.1, 234.1

(56) References Cited

U.S. PATENT DOCUMENTS

| | | | |
|---|---|---|---|
| 4,292,598 A | | 9/1981 | Yasumura ..................... 330/281 |
| 5,406,593 A | | 4/1995 | Chennakeshu et al. ...... 375/120 |
| 5,457,813 A | | 10/1995 | Poutanen ....................... 455/70 |
| 5,469,115 A | | 11/1995 | Peterzell et al. ............. 330/129 |
| 5,566,165 A | * | 10/1996 | Sawahashi et al. ............ 370/18 |
| 5,640,385 A | | 6/1997 | Long et al. ..................... 370/18 |
| 6,034,952 A | * | 3/2000 | Dohi et al. ................... 370/335 |
| 6,052,566 A | * | 4/2000 | Abramsky et al. .......... 455/67.1 |
| 6,069,912 A | * | 5/2000 | Sawahashi et al. .......... 375/142 |
| 6,078,796 A | * | 6/2000 | Ling .......................... 455/234.1 |
| 6,157,687 A | * | 12/2000 | Ono ............................. 375/347 |
| 6,163,705 A | * | 12/2000 | Miya ........................... 455/522 |

FOREIGN PATENT DOCUMENTS

| | | |
|---|---|---|
| EP | 0 682 419 | 11/1995 |
| EP | 0 762 668 | 3/1997 |
| EP | 0 853 393 | 7/1998 |

* cited by examiner

*Primary Examiner*—Chi Pham
*Assistant Examiner*—Dung X. Nguyen
(74) *Attorney, Agent, or Firm*—Burns, Doane, Swecker & Mathis, L.L.P.

(57) ABSTRACT

The present invention provides a method for measuring SIR in a WCDMA system where channels are transmitted from a base station using orthogonal channelization codes and the same scrambling codes. According to exemplary embodiments of the present invention, an automatic gain controller (AGC) is implemented in the receiver. The AGC is placed prior to the RAKE receiver. By using a fairly fast AGC unit that keeps incoming power to the RAKE at a constant level, the SIR can be calculated by multiplying the despread signal with a constant. This SIR calculation aids in achieving and maintaining a steady state condition in the radio communication system. This SIR calculation can also be used to control the bit error rate performance of a mobile station.

10 Claims, 8 Drawing Sheets

USING A FAST AGC AS PART OF SIR CALCULATION

BACKGROUND

The present invention relates generally to radio communication systems and, more particularly, to techniques and structures for measuring the signal-to-interference ratio of a signal received in a wideband code division multiple access system.

Traditionally, radio communication systems have employed either Frequency Division Multiple Access (FDMA) or Time Division Multiple Access (TDMA) to allocate access to available radio spectrum. Both methods attempt to ensure that no two potentially interfering signals occupy the same frequency at the same time. For example, FDMA assigns different signals to different frequencies. TDMA assigns different signals to different time slots on the same frequency. TDMA methods reduce adjacent channel interference through the use of synchronization circuitry which gates the reception of information to prescribed time intervals.

In contrast, Code Division Multiple Access (CDMA) systems allow interfering signals to share the same frequency at the same time. More specifically, CDMA systems "spread" signals across a common communication channel by multiplying each signal with a unique spreading code sequence. The signals are then scrambled and transmitted on the common channel in overlapping fashion as a composite signal. Each mobile receiver correlates the composite signal with a respective unique despreading code sequence to thereby extract the signal addressed to it.

The signals which are not addressed to a mobile receiver in CDMA assume the role of interference. To achieve reliable reception of a signal, the ratio of the signal to the interference should be above a prescribed threshold for each mobile station (referred to as a "required signal-to-interference" level, or $SIR_{req}$) For example, as shown in FIG. 1A, consider the case where three mobile stations receive, respectively, three signals from a common CDMA communication band. Each of the signals has a corresponding energy associated therewith—namely energy levels E1, E2 and E3, respectively. The communication band also contains a certain level of noise (N). For the first mobile station to receive its intended signal, the ratio between E1 and the aggregate levels of E2, E3 and N should be above the first mobile's required signal-to-interference ratio.

To improve the signal-to-interference ratio for a mobile, the energy of the signal is increased to appropriate levels. However, increasing the energy associated with one mobile station increases the interference associated with other nearby mobile stations. As such, it is desirable for the radio communication system to strike a balance between the requirements of all mobile stations sharing the same common channel. A steady state condition is reached when the SIR requirements for all mobile stations within a given radio communication system are satisfied. Generally speaking, the balanced steady state may be achieved by transmitting to each mobile station using power levels which are neither too high nor too low. Transmitting messages at unnecessarily high levels raises interference experienced at each mobile receiver, and limits the number of signals which may be successfully communicated on the common channel (i.e., it reduces system capacity).

Once a steady state condition is achieved, adjustments are made for various changes within the mobile communication system. For instance, when a new mobile station enters a communication cell, it creates additional interference within the system. For example, as illustrated in FIG. 1B, the introduction of a fourth mobile station to the steady state condition depicted in FIG. 1A imposes a new signal on the common communication channel with energy E4. This new signal energy E4 adds to the aggregate interference experienced by the first through third mobile stations already in the cell. Accordingly, in order to satisfy the required signal-to-interference ratios of the first through third stations, the power associated with the first three mobile stations E1–E3 may have to be adjusted accordingly. The same disruptive effect may be experienced when a mobile station which was previously located within the boundaries of the radio communication cell switches from a passive state to an active state to transmit or receive a message on the common channel.

The steady state condition is also disrupted when a mobile station leaves the radio communication cell. For example, if the steady state condition shown in FIG. 1A is disrupted by the third mobile station leaving the radio communication cell, the signal-to-interference ratio of the remaining two mobile stations are improved by the absence of the energy E3 on the common channel, as shown in FIG. 1C. Accordingly, the power of signals E1–E2 can be decreased to ensure efficient use of the common communication channel. Again, this same effect may be achieved when the third mobile station within the radio communication cell switches from active to passive state (e.g. by terminating its call).

Still another disruption of the steady state may occur when one or more mobile stations within a radio communication cell changes its operating characteristics. For example, as illustrated in FIG. 1D, if the third mobile station switches from a low data-rate mode of communication to a high data-rate mode of communication, the remaining two mobile stations within the cell experience increased levels of interference. To counteract the increased levels of interference in the communication band, the system may have to adjust the power levels E1 and E2. The reverse effect may occur when a mobile station switches from a high data-rate mode to a low data-rate mode.

Prior CDMA-based systems use one or more power control loops to appropriately adjust the power levels of signal transmissions within the system in order to counteract the above-described disruptions to the steady state condition. According to one exemplary prior technique, for the downlink the mobile station monitors the strength at which it receives signals from the base site. If the signals are too weak, the mobile station transmits a message to its associated base station informing the base station to increase the power at which it transmits to the mobile station. The base station responds accordingly. However, over time, the base "teases" the mobile station by slowly decreasing the power to the mobile station until the base station is informed by the mobile station to once again increase the power of transmission to the mobile station. This ensures that the base station is not communicating with the mobile stations using power levels which are unnecessarily high.

For example, in the case of FIG. 1B where a fourth mobile station enters a cell, the other mobile stations may instruct the base station to increase the level of power to the mobile stations. The base station responds accordingly by increasing the power by one increment. If still insufficient to satisfy the mobile station's SIR requirements, the mobile stations repeat their message to the base station, once again requesting the base station to increase the level at which it transmits messages to the mobile stations. This procedure may be repeated through a series of communications between the base and the mobile stations. If the base "overshoots" the power requirements of the mobile stations, it may have to decrease the power levels to the mobile stations.

In order to achieve and maintain this desired steady state condition, a method is needed to quickly and accurately measure a mobile station's signal-to-interference ratio. In a system employing wideband code division multiple access (WCDMA), channels are commonly transmitted from one base station using orthogonal channelization codes and the same scrambling codes; therefore, in making a SIR determination in such a WCDMA system, one should not only consider the interference from the base station which is orthogonal to the wanted signal, but also the interference from other base stations which is non-orthogonal to the wanted signal. When a signal is despread and combined at a mobile station, one skilled in the art will appreciate that the interference that is orthogonal to the wanted signal does not corrupt the signal. However, this cannot be said of the interference that is non-orthogonal to the wanted signal. Therefore, it is important to consider this non-orthogonal interference in estimating the mobile station's SIR.

Several methods exist for measuring the interference power associated with a received signal. According to a first approach, the searcher of the RAKE receiver generates an impulse response estimate of the received signal. The impulse response estimate is produced by, for example, match filtering the received signal with a signal that is known by the receiver to be included in the transmitted signal (i.e., the pilot signal). All received power, excluding the peaks, is used to estimate the interference. This approach is not only slow, but is also insensitive to the orthogonality or lack of orthogonality of the interference. Therefore, such an approach is incapable of providing an estimate of the non-orthogonal interference.

A second approach involves estimating the received power after despreading and combining of the pilot symbols. Assuming that the received signal power is constant for some period of time, the variance of the interference corrupting the signal can be estimated. This estimation is accomplished by using the mean value of the received despread and combined pilot symbols to calculate the distance from each sample of despread and combined pilot symbols to this mean value. Using these "noise vectors", the variance of the interference can be estimated. This approach includes the orthogonality aspect if the measurement is done for all paths considered in the despreading process. However, it relies on the existence of a pilot symbol. If the pilot symbols are time-multiplexed, and thus discontinuous transmitted, the measurement can only be made when the pilot symbols are transmitted thereby resulting in intermittent SIR calculations.

A third method for determining the interference associated with a received signal involves correlating the received signal with the channelization code allocated to the connection during a time when nothing is being transmitted to the mobile station. Since there is no "wanted" signal, despreading the received signal would then yield a good estimate of the interference. A problem with this approach is that the mobile station has to know when no information is being transmitted to it. This could be solved by having predetermined time-instants of no transmission, but such a solution has a certain capacity loss, since the interference measurement would need to be updated quite regularly.

There exists a problem in how to quickly and accurately measure the SIR in these WCDMA systems which takes into consideration signal interference which is both orthogonal and non-orthogonal to the wanted signal.

SUMMARY

The present invention seeks to overcome the above-identified deficiencies by providing a method for quickly and accurately measuring the SIR in a WCDMA system where channels are transmitted from a base station using orthogonal channelization codes.

According to an exemplary embodiment of the present invention, an automatic gain control (AGC) unit is implemented in the receiver. The AGC unit is placed prior to the RAKE receiver. By using a fairly fast AGC unit that keeps incoming power to the RAKE at a constant level, the SIR can be calculated by multiplying the despread pilot symbol with a constant. This SIR calculation aids in achieving and maintaining a steady state condition in the radio communication system. This SIR calculation can also be used to control the bit error rate performance of a mobile station.

BRIEF DESCRIPTION OF THE DRAWINGS

The above objects and features of the present invention will be more apparent from the following description of the preferred embodiments with reference to the accompanying drawings, wherein.

DETAILED DESCRIPTION

Figure 1A:
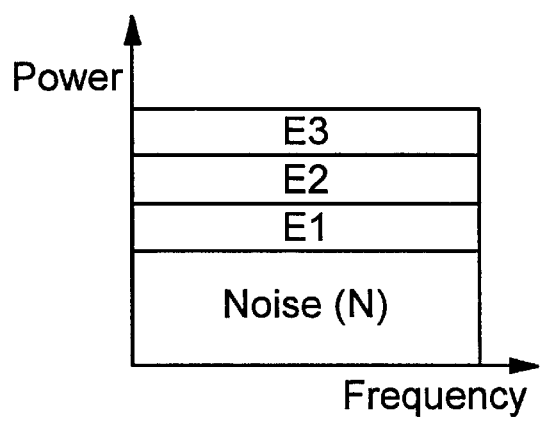
FIG. 1A shows an exemplary distribution of signal energies within a common band in a steady state condition.
Figure 1B:
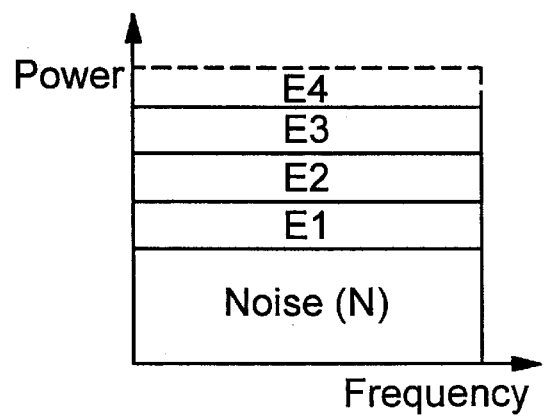
FIG. 1B shows an exemplary distribution of signal energies within a common band after the introduction of a new mobile station.
Figure 1C:
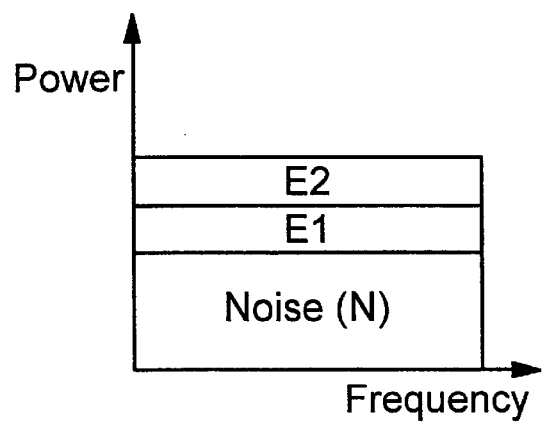
FIG. 1C shows an exemplary distribution of signal energies within a common band after the removal of a mobile station.
Figure 1D:
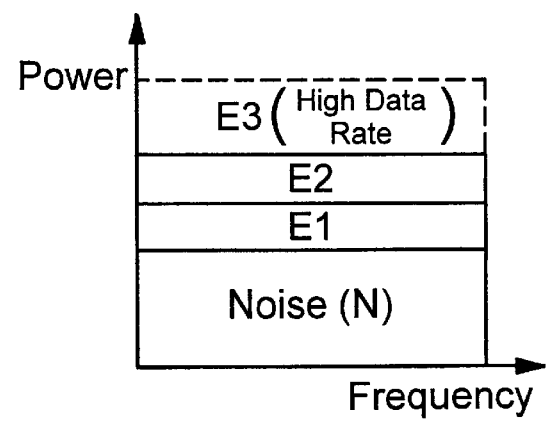
FIG. 1D shows an exemplary distribution of signal energies within a common band after a mobile station switches from low to high data-rate mode.
Figure 2:
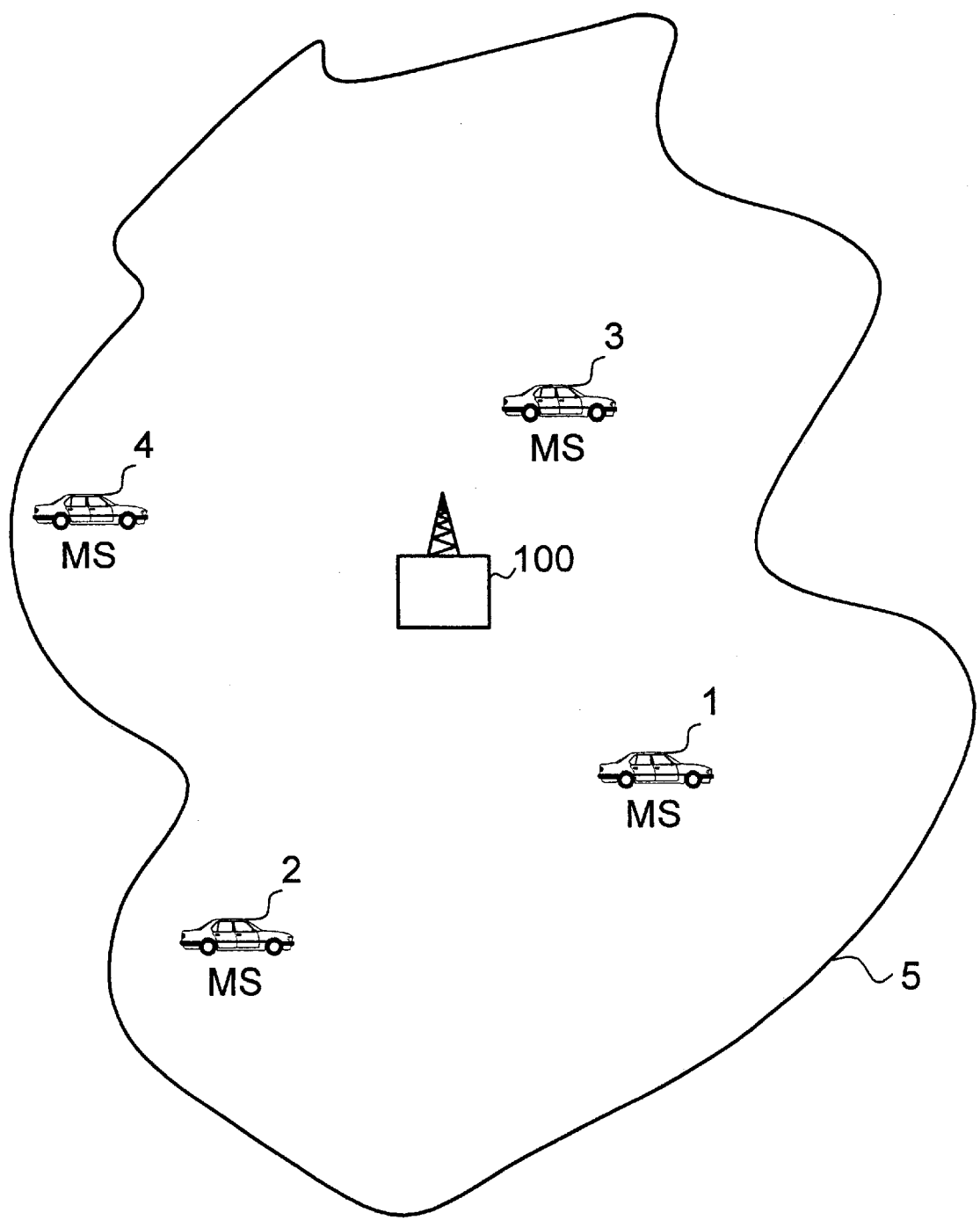
FIG. 2 is a cell diagram illustrating a base station and several mobile stations.

Consider the exemplary situation depicted in FIG. 2. Therein, a base station 100 is currently handling connections with three mobile stations, M1, M2 and M3. For the purposes of this exemplary embodiment, consider that the system depicted in FIG. 2 operates using a WCDMA technology with duplexes downlink (i.e. base-to-mobile direction) and uplink (i.e. mobile-to-base direction) channels.

In the downlink, base station 100 transmits to each of mobile stations M1, M2 and M3 using a certain power level associated with each of these mobile stations. The exemplary signals, transmitted from the base station 100, are spread using orthogonal code words. In the uplink, mobile stations M1, M2 and M3 communicate with base station 100, each using a certain power level. Although not shown, the base station 100 is in communication with a radio network controller (RNC), which in turn is connected to a public switched telephone network (PSTN).

The transmission of signals in the exemplary WCDMA system depicted in FIG. 2 can be characterized as follows. An information data stream to be transmitted is first multiplied with a channelization code and then with a scrambling code. The information data stream and the scrambling code can have the same or different bit rates. The information data stream and the scrambling code are combined by multiplying the two bit streams together. Each information data stream or channel is allocated a unique channelization code. According to the present invention, the unique channelization code is a unique orthogonal code word. A plurality of coded information signals are transmitted on radio frequency carrier waves and jointly received as a composite signal at a receiver. Each of the coded signals overlaps all of the other coded signals, as well as noise related signals, in both frequency and time.

At the mobile station, the received composite signal is processed to produce an estimate of the original message. This process is known as demodulation. Demodulation is commonly performed by a RAKE receiver which is a type of receiver where several propagation paths can be detected and combined, or "raked", together before decoding. These different propagation paths of a radio signal occur, for example, because of reflections from buildings or other large nearby obstacles. This combination or "raking" is an advantageous way of utilizing as much of the transmitted energy as possible in the detection of the wanted signal.

The composite signal is despread by the receiver using user-specific spreading codes related to a particular transmitted signal which is to be retrieved. When user-specific spreading codes are orthogonal to one another, the received signal can be correlated with a particular user spreading code such that only the desired signal related to a particular spreading code is enhanced while the other signals for all the other users which are orthogonal to the wanted signal are not enhanced. More information regarding this process can be found in commonly assigned, U.S. Pat. No. 6,067,446 and entitled "Power Presetting in a Radio Communication System", the entirety of which is incorporated by reference herein.

As set forth in detail above, a steady state condition is achieved in the radio communication system depicted in FIG. 2 when the SIR requirements for all mobile stations are satisfied. Once a steady state condition is achieved, it is necessary to quickly approximate the SIR for each mobile station in order to maintain this state. The present invention recognizes that since the wanted signal and the orthogonal interference originate from the same place (i.e., they originate from the same base station), they will fade at the same time and place. Therefore, by using a fairly fast AGC that keeps incoming power to the RAKE at a constant level, the SIR can be quickly approximated by using the despread received signal strength.

Figure 3:
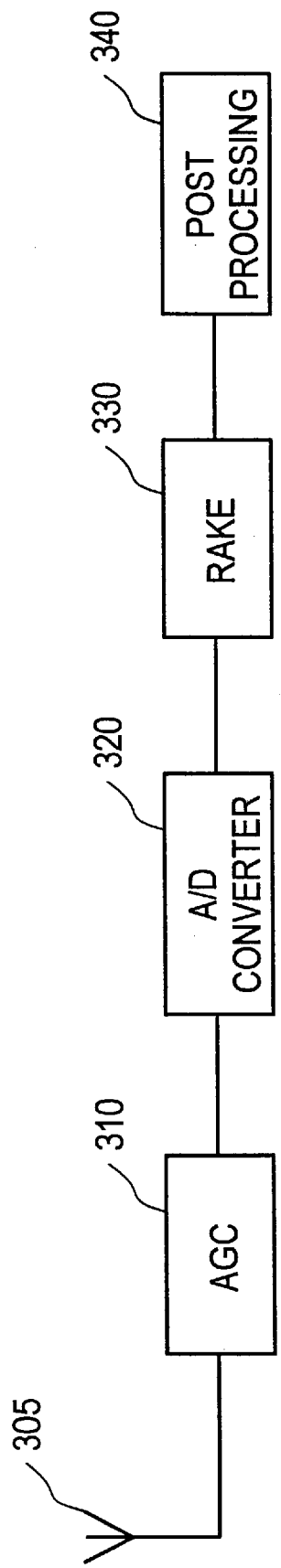
FIG. 3 illustrates an exemplary mobile station into which the SIR calculation technique of the present invention may be incorporated.

FIG. 3 illustrates an exemplary mobile station into which the SIR calculation technique of the present invention may be implemented. In FIG. 3, the mobile station includes an antenna 305 for receiving a transmitted analog signal, an automatic gain controller (AGC) 310 for adjusting the power of the received analog signal to a desired level, an analog-to-digital (A/D) converter 320 for converting the adjusted analog signal to a digital signal and a RAKE receiver 330 for isolating and combining individual rays of the received signal. Once combined, the signal is subjected to post processing 340. One skilled in the art will appreciate that the mobile station illustrated in FIG. 3 includes additional circuitry (not shown) which aids in the sending, receiving and processing of data.

Figure 4:
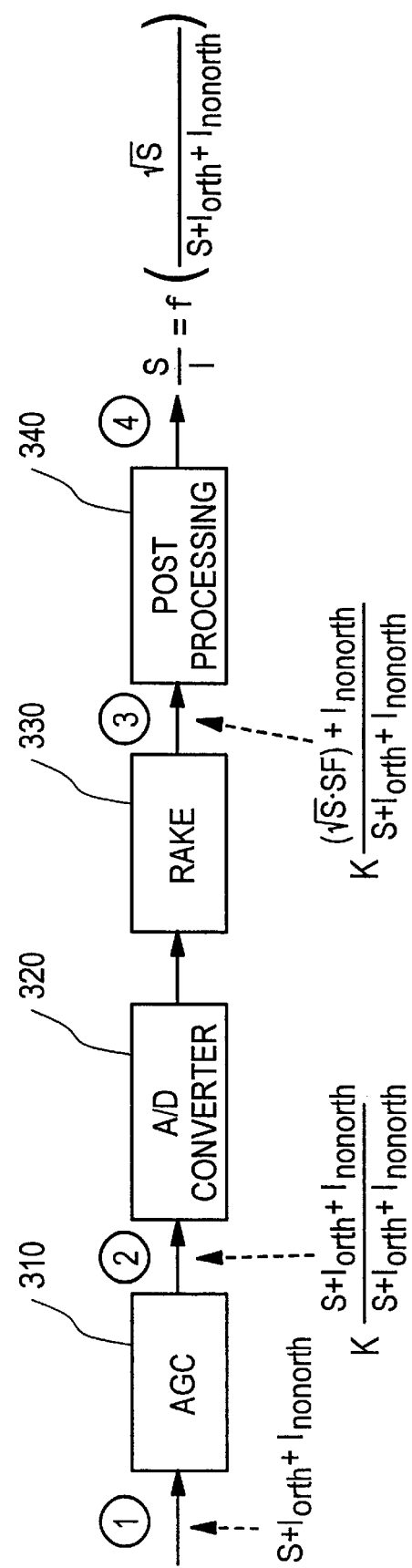
FIG. 4 illustrates the SIR calculation technique of the present invention as implemented in the exemplary mobile station of FIG. 3.

The SIR calculation technique according to a first exemplary embodiment of the present invention will now be described with respect to FIG. 4. As indicated above, the mobile station receives an analog signal which includes both the signal intended for the mobile station and interference. As illustrated at point 1 in FIG. 4, the power of the received signal (RS) includes the power of the received wanted signal (S) and the power of any existing interference from the same base station that is orthogonal to the wanted signal ($I_{ORTH}$). In addition, the power of the received signal includes the power of any noise and interference from other base stations that are non-orthogonal to the wanted signal ($I_{NONORTH}$). The following equation illustrates this relationship:

$$RS = S + I_{ORTH} + I_{NONORTH}. \tag{1}$$

The AGC 310, according to an exemplary embodiment of the present invention, is a fast AGC (i.e., an AGC where the bandwidth is much higher than the slot frequency) that limits the need for dynamic range in the receiver by scaling the received signal to some wanted power level. The operation of an AGC is well known in the art; therefore, for the sake of brevity, the details of such will not be set forth herein.

According to the present invention, the AGC 310 multiplies the received signal with $$\frac{K}{S+I} \tag{2}$$

where K is a constant and "S+I" represents the power of the received signal. The constant K is selected so as to obtain the correct power level for the A/D converter 320. Here it is assumed that the mean power level that is input into the A/D converter 320 is K Watts. By multiplying the power of the received signal with a ratio of a constant (K) divided by the power of the received signal, a desired power level can be achieved. As illustrated at point 2, the result of the multiplication operation results in $$K \frac{S + I_{ORTH} + I_{NONORTH}}{S + I_{ORTH} + I_{NONORTH}}. \tag{3}$$

The A/D converter 320 converts the power-adjusted analog signal from the AGC 310 to a digital signal for input to the RAKE receiver 330. One skilled in the art will appreciate that, in the alternative, the received signal could be a digital signal. This would obviate the need for an A/D converter. In such an event, the output of the AGC 310 would be directly transferred to the RAKE receiver 330.

In the RAKE receiver 330, the digital signal is despread by multiplying the signal with the unique orthogonal code word associated with the particular mobile station. As a result, the amplitude of the wanted signal increases and the orthogonal part of the interference disappears. The power of the rest of the interference (i.e., that interference which is non-orthogonal) is not changed.

Figure 5:
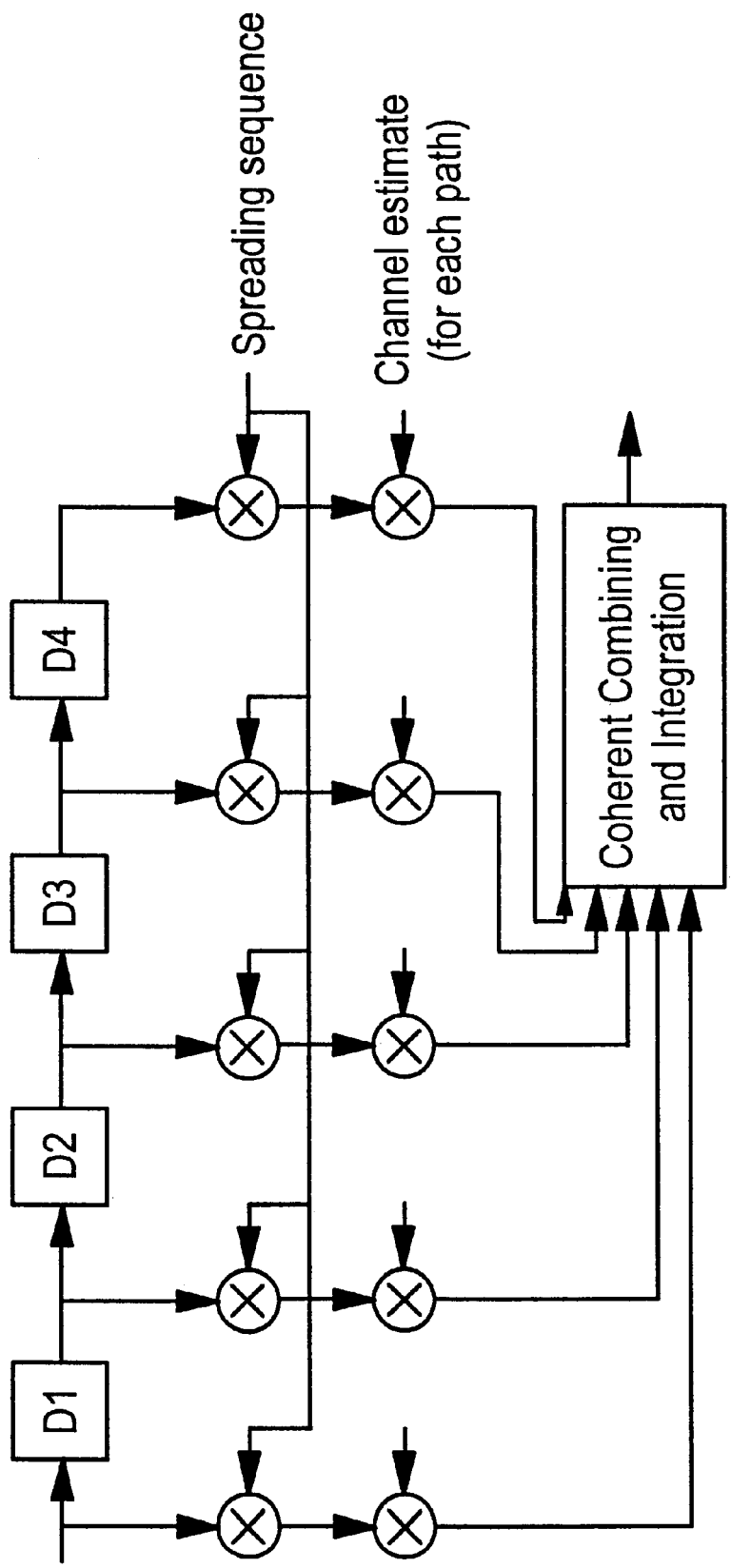
FIG. 5 illustrates an exemplary RAKE receiver.

FIG. 5 illustrates the operation of an exemplary RAKE receiver. In FIG. 5, the received signal is delayed corresponding to each measured path in order to make the paths time aligned. Thereafter, each path is despread with the spreading sequence and multiplied with the complex conjugate of the channel estimate which weighs the importance and aligns the phases of the different paths. Finally, the paths are combined.

Returning to FIG. 4, the output (point 3) of the RAKE receiver produces the following:

$$K \frac{\sqrt{S} \cdot SF + I_{NONORTH}}{S + I_{ORTH} + I_{NONORTH}} \quad (4)$$

where SF is the spreading factor. Assuming that the interference which is non-orthogonal to the wanted signal is negligible compared to the factor ($\sqrt{S} \times SF$), then the output of the RAKE receiver becomes $$K \frac{\sqrt{S} \cdot SF}{S + I_{ORTH} + I_{NONORTH}}. \quad (5)$$

Since K and SF are known values, dividing the above equation by K and SF results in $$\frac{\sqrt{S}}{S+I}. \quad (6)$$

The output of the RAKE 330 is then subjected to post processing 340 in order to approximate the SIR. One skilled in the art will appreciate that the SIR is a function of the ratio of the square root of the power of the wanted signal to the power of the received signal. The following equation illustrates this relationship:

$$\frac{S}{I} = f\left(\frac{\sqrt{S}}{S+I}\right). \quad (7)$$

Figure 6:
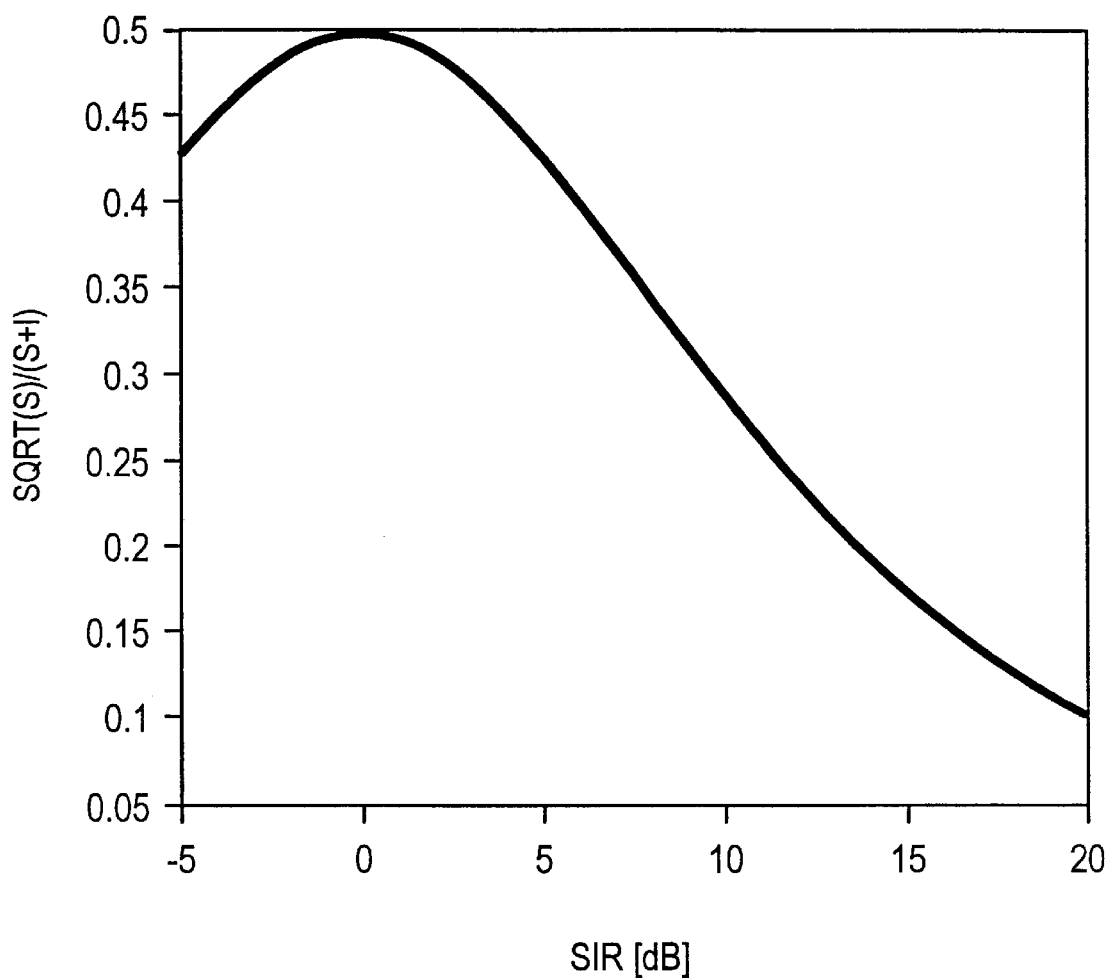
FIG. 6 illustrates the relationship between the squared root of the power of a wanted signal over the power of a received signal and the SIR according to the present invention.

FIG. 6 graphically illustrates the above relationship. One skilled in the art will appreciate that the relevant SIR values for a connection are the values that are positive. As evident from FIG. 6, a nearly one-to-one relationship exists between the positive values of the SIR and the output of the RAKE receiver 330.

In order to achieve an even better SIR approximation, the output of the RAKE 330 can be divided by the power of the received signal (S+I), which is a known value. In such an event, equation (6) becomes $$\frac{S}{I} = f\left(\frac{\sqrt{S}}{(S+I)^2}\right). \quad (8)$$

Figure 7:
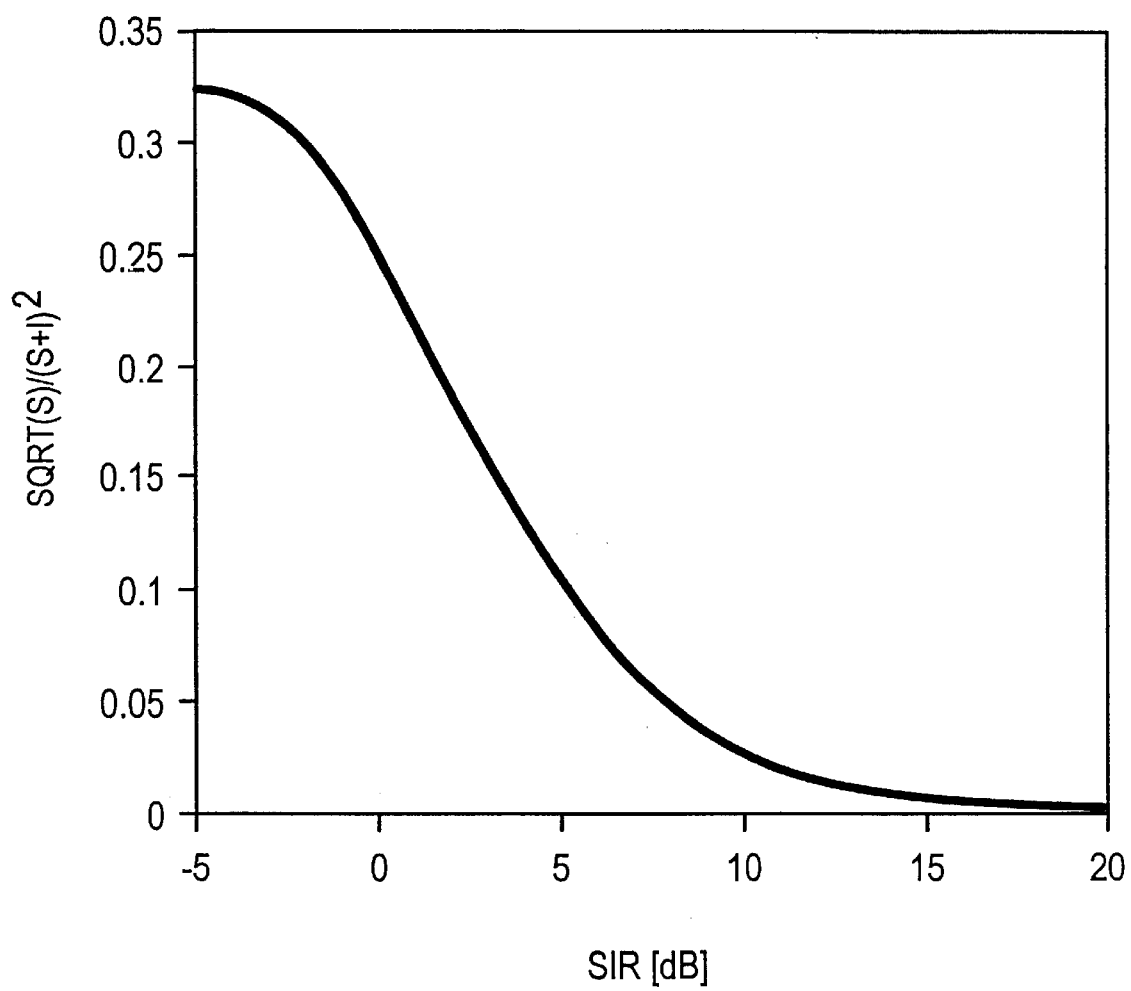
FIG. 7 illustrates the relationship between the squared root of the power of a wanted signal over the squared power of a received signal and the SIR according to the present invention.

FIG. 7 illustrates this relationship. As evident from FIG. 7, a one-to-one relationship exists for all SIR values.

By approximating the SIR in one of the two above-described manners, the mobile stations within the radio communication system can determine whether the base station is transmitting at an appropriate power level. In those instances where adjustments need to be made, a mobile station, by using this calculation technique, is provided with a quick approximation of the SIR. When each mobile station's SIR requirements have been satisfied, a steady state condition is achieved.

According to a second exemplary embodiment of the present invention, the SIR calculation can be used to control the bit error rate (BER) performance of the receiver. One skilled in the art will appreciate that the BER performance of the receiver is dependent on the SIR and that part of the interference that is non-orthogonal to the wanted signal. As a result, it is desirable to be able to measure that interference which is non-orthogonal to the wanted signal in addition to approximating the SIR in the manner described above.

To get a good estimation of the non-orthogonal interference, an unused channelization code (i.e., a channelization code which is unique from all orthogonal codes used in the spreading of the transmitted signal) is used in the RAKE receiver. When the received signal is despread with this unused channelization code, the part of the received signal that is not orthogonal to the wanted signal is detected (i.e., the wanted signal and those signals orthogonal to the wanted signal cancel out thereby leaving those signals which are non-orthogonal). Thus, in FIG. 4, the power level $I_{NONORTH}/(S+I_{ORTH}+I_{NONORTH})$ is measured at point 3.

Two approaches can be used to estimate the SIR using this power level. In a first approach, the value $\sqrt{S}/(S+I_{ORTH}+I_{NONORTH})$ which was calculated above with respect to the first embodiment, is divided by the power level $I_{NONORTH}/(S+I_{ORTH}+I_{NONORTH})$ resulting in $$\frac{\frac{\sqrt{S}}{S+I_{ORTH}+I_{NONORTH}}}{\frac{I_{NONORTH}}{S+I_{ORTH}+I_{NONORTH}}} = \frac{\sqrt{S}}{I_{NONORTH}}. \quad (9)$$

The SIR can then be determined as follows:

$$\frac{S}{I_{NONORTH}} = f\left(\frac{\sqrt{S}}{I_{NONORTH}}\right). \quad (10)$$

In a second approach, the value $\sqrt{S}/(S+I_{ORTH}+I_{NONORTH})$ is squared and then divided by the power level $I_{NONORTH}/(S+I_{ORTH}+I_{NONORTH})$, resulting in $$\frac{\frac{S}{(S+I_{ORTH}+I_{NONORTH})^2}}{\frac{I_{NONORTH}}{S+I_{ORTH}+I_{NONORTH}}} = \frac{S}{I_{NONORTH}(S+I_{ORTH}+I_{NONORTH})}. \quad (11)$$

By multiplying equation (11) with the power of the received signal (i.e., S+I), the SIR is determined.

As an alternative to using an unused channelization code, one skilled in the art will appreciate that a mobile station could use its unique channelization code, during those instances when no signals are being transmitted to the mobile station (e.g., during speech pauses), in order to make the above-described estimation of the non-orthogonal interference. It is evident that under those circumstances, since there is no wanted signal, multiplication by the assigned channelization code would provide an estimate of the power of the non-orthogonal interference.

As is evident from above, if the power of the received signal is measured in an open loop (i.e., measured by the mobile station), then an estimate of the non-orthogonal interference can be made for controlling the bit error rate. In situations where it is determined that the BER performance of the mobile station is below a predetermined threshold, then the SIR can be increased in order to obtain a better BER.

Figure 8:
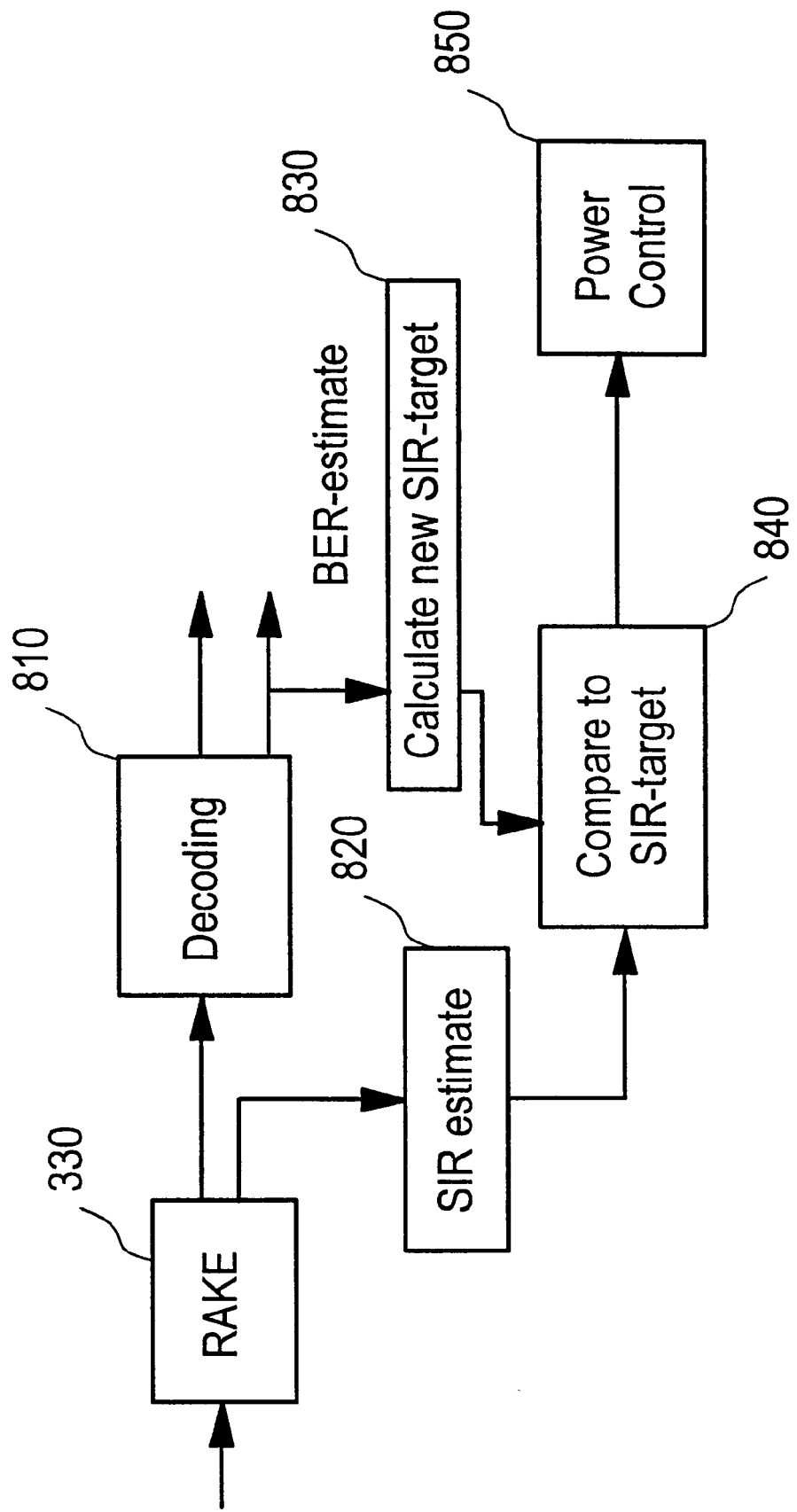
FIG. 8 illustrates a system for adjusting the BER performance of a mobile station using an estimated SIR according to an exemplary embodiment of the present invention.

FIG. 8 illustrates a power control loop for controlling the BER performance using the SIR calculated using the non-orthogonal interference. In FIG. 8, the output of the RAKE 330 is used by the SIR estimation unit 820 to estimate the SIR using one of the two approaches described above. The output of the RAKE 330 is also transferred to a decoding unit 810 where the bit error rate is estimated in a well known manner. In those situations where the BER performance of the mobile station is below a predetermined threshold, a new SIR value can be calculated in the SIR calculation block 830 that would provide an improve BER performance. This new target SIR is then compared in block 840 to the estimated SIR from block 820. If the estimated SIR value is below the new target SIR value, then a signal is transferred to the power control block 850 to indicate that an increase in power is required. A request for an increase in power is then transferred to the base station and the transmission power is adjusted accordingly.

The foregoing has described the principles, preferred embodiments and modes of operation of the present invention. However, the invention should not be construed as being limited to the particular embodiments discussed above. For example, while the above-described embodiments utilized orthogonal spreading codes, one skilled in the art will appreciate that other spreading codes could be utilized without departing from the spirit and scope of the invention. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method for estimating a signal-to-interference ratio (SIR) in a mobile station, said method comprising the steps of:

adjusting, by using a fast automatic gain controller, a power level of a received signal by multiplying said signal with a constant;

despreading the multiplied signal using a RAKE receiver; and estimating said SIR using a power level of said despread signal.

2. The method of claim 1 further comprising the step of:

dividing, prior to said estimating step, said power level of said despread signal by the power level of said received signal to produce a resulting power level, wherein said estimating step uses said resulting power level in estimating said SIR.

3. A system for estimating a signal-to-interference ratio (SIR) in a mobile station, said system comprising:

a fast automatic gain controller for adjusting a power level of a received signal to a predetermined level;

a RAKE receiver for despreading the signal output from said automatic gain controller; and means for estimating said SIR using a power level of said despread signal.

4. The system of claim 3 further comprising:

post processing means for dividing said power level of said despread signal by the power level of said received signal and for outputting a result, wherein said means for estimating uses said result in estimating said SIR.

5. A method for controlling a bit error rate (BER) performance of a mobile station, said method comprising the steps of:

adjusting a power level of a composite signal by multiplying said signal with a constant;

detecting interference which is non-orthogonal to a wanted signal by despreading the power adjusted signal using an unused channelization code; and controlling the BER using said detected interference.

6. The method of claim 5 further comprising the step of estimating a signal-to-interference ratio using said detected interference.

7. A system for controlling a bit error rate (BER) performance of a mobile station, said system comprising:

an automatic gain controller for adjusting a power level of a composite signal by multiplying said signal with a constant;

a RAKE receiver for detecting interference which is non-orthogonal to a wanted signal by despreading the power adjusted signal using an unused channelization code; and means for controlling the BER using said detected interference.

8. The system of claim 7 further comprising means for estimating a signal-to-interference ratio using said detected interference.

9. The method of claim 1, wherein the fast automatic gain controller has a bandwidth which is much higher than a slot frequency.

10. The system according to claim 3, wherein the fast automatic gain controller has a bandwidth which is much higher than a slot frequency.

* * * * *